US010550317B2

(12) United States Patent
Eluru et al.

(10) Patent No.: US 10,550,317 B2
(45) Date of Patent: Feb. 4, 2020

(54) SUGAR BASED EPOXY RESINS WITH ENHANCED PROPERTIES FOR SAND CONSOLIDATION IN SUBTERRANEAN FORMATIONS

(71) Applicant: Halliburton Energy Services, Inc., Houston, TX (US)

(72) Inventors: Sairam Eluru, Houston, TX (US); Rajender Salla, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/746,340

(22) PCT Filed: Aug. 26, 2015

(86) PCT No.: PCT/US2015/046905
§ 371 (c)(1),
(2) Date: Jan. 19, 2018

(87) PCT Pub. No.: WO2017/034559
PCT Pub. Date: Mar. 2, 2017

(65) Prior Publication Data
US 2018/0230367 A1    Aug. 16, 2018

(51) Int. Cl.
*E21B 43/267*    (2006.01)
*E21B 43/04*    (2006.01)
(Continued)

(52) U.S. Cl.
CPC ............ *C09K 8/805* (2013.01); *C08G 59/188* (2013.01); *C08G 59/3236* (2013.01);
(Continued)

(58) Field of Classification Search
CPC .. C09K 8/805; C09K 8/80; C09K 8/56; E21B 43/267; E21B 21/003; E21B 43/04;
(Continued)

(56) References Cited

U.S. PATENT DOCUMENTS

| 5,921,317 A | 7/1999 | Dewprashad et al. |
| 7,013,976 B2 | 3/2006 | Nguyen et al. |

(Continued)

FOREIGN PATENT DOCUMENTS

WO    2015088515    6/2015

OTHER PUBLICATIONS

International Search Report and Written Opinion for Application No. PCT/US2015/046905 dated May 13, 2016.
(Continued)

*Primary Examiner* — Zakiya W Bates
(74) *Attorney, Agent, or Firm* — Thomas Rooney; C. Tumey Law Group PLLC (57) ABSTRACT

A method of treating a subterranean formation including providing a sugar based hardenable resin, providing proppant particles, providing a hardening agent, combining the sugar based hardenable resin and the hardening agent to form a resin compound, coating the resin compound onto at least a portion of the proppant particles to create resin-coated proppant particles, and placing the coated proppant particles into a subterranean formation zone, wherein the resin compound does not substantially cure prior to placing the resin coated proppant particles into the subterranean formation zone.

22 Claims, 2 Drawing Sheets

(51) Int. Cl.
*C09K 8/80* (2006.01)
*C08G 59/18* (2006.01)
*C08G 59/32* (2006.01)
*C09D 163/00* (2006.01)
*C09K 8/575* (2006.01)
*C08K 3/04* (2006.01)

(52) U.S. Cl.
CPC .......... *C09D 163/00* (2013.01); *C09K 8/5755* (2013.01); *E21B 43/04* (2013.01); *E21B 43/267* (2013.01); *C08K 3/04* (2013.01); *C08K 2201/011* (2013.01)

(58) Field of Classification Search
CPC ........ E21B 33/138; E21B 43/25; E21B 43/26; E21B 43/261
See application file for complete search history.

(56) References Cited

U.S. PATENT DOCUMENTS

| | | |
|---|---|---|
| 8,551,924 B2 | 10/2013 | Rickman et al. |
| 2005/0059555 A1 | 3/2005 | Dusterhoft et al. |
| 2011/0278003 A1* | 11/2011 | Rediger .................. C09K 8/805 166/280.1 |
| 2012/0220504 A1 | 8/2012 | Rickman et al. |
| 2013/0072613 A1 | 3/2013 | Miltner et al. |
| 2014/0116711 A1 | 5/2014 | Tang |
| 2017/0218263 A1 | 8/2017 | Salla et al. |

OTHER PUBLICATIONS

"Stablilizing wellbores in unconsolidated, clay-laden formations" by Nguyen et al. Published Feb. 18-20, 2004. SPE 86559.
"Functionalized Graphenes and Thermoplastic Nanocomposites Based upon Expanded Graphite Oxide" by Steurer et al. published by Macromol. Rapid Commun. 2009, 30, pp. 316-327.
"Functionalization of Graphene: Covalent and Non-Covalent Approaches, Derivatives and Applications" by Georgakilas et al. published in Chem. Rev., 2012, 112 (11), p. 6156-6214 in 2012.
"Superior Thermal Conductivity of Single Layer Graphene" by Balandin et al. published by NanoLett.2008,8 (3), 902-907 in 2008.
"Novel high glass temperature sugar-based epoxy resins: Characterization and comparison to mineral oil-based aliphatic and aromatic resins" by Niedemiann et al. published in eXPRESS Polymer Letter vol. 9, No. 2 pp. 85-94 in 2015.

* cited by examiner

SUGAR BASED EPOXY RESINS WITH ENHANCED PROPERTIES FOR SAND CONSOLIDATION IN SUBTERRANEAN FORMATIONS

BACKGROUND

The present invention generally relates to the use of curable resin treatment fluids in subterranean operations, and, more specifically, to the use of sugar based epoxy resin treatment fluids comprising sugar based epoxy resin compounds and proppants, and methods of using these treatment fluids in subterranean operations.

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Conventional treatment methods involve treating the porous, unconsolidated mass sand around the wellbore in order to cement the loose sand grains together, thereby forming a permeable consolidated sand mass which will allow production of fluids but which will restrain the movement of sand particles into the wellbore. These procedures create a permeable barrier or sieve adjacent to the perforations or other openings in the well casing which establish communication between the production formation and the production tubing, which restrains the flow of loose particulate mineral matter such as sand.

Oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. To accomplish this, a viscous fracturing fluid may be pumped down the casing to the formation at a rate and a pressure sufficient to form fractures that extend into the formation, providing additional pathways through which the oil or gas can flow to the well. A proppant is a solid material, typically treated sand or man-made ceramic materials, designed to keep an induced hydraulic fracture open, during or following a fracturing treatment. It is added to the fracturing fluid. After the fracturing procedure has been completed, it may be desirable to consolidate the proppant materials.

Typical sand consolidation treatments use plastic resins, and are not entirely satisfactory. Resins tend to reduce the permeability of the consolidated formation below acceptable levels. The toxicity of the plastic resins may also be an environmental issue. In addition, traditional "green" resins, such as mineral oil or vegetable based epoxy resins, may start having reduced modulus values at higher temperatures.

Accordingly, an ongoing need exists for environmentally friendly resin systems that may be used in higher temperature environments for consolidating and fracturing operations in subterranean formations.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The present invention discloses a coating system that enhances the physical properties of natural sand in order to be used for high temperature high pressure HTHP wells. Although traditional epoxy resins may handle different thermal conditions well, they have health, safety, and environmental issues, and are increasingly becoming discouraged for use in areas like the North Sea.

In various embodiments, high glass transition temperature sugar based epoxy resins with a hardener may be used in consolidating and fracturing applications.

In some embodiments of the present invention, a method of treating a wellbore in a subterranean formation includes combining a sugar based hardenable resin and a hardening agent to form a resin compound, coating the resin compound onto at least a portion of proppant particles to create resin-coated proppant particles, and placing the coated proppant particles into a subterranean formation zone, wherein the resin compound does not substantially cure prior to placing the resin coated proppant particles into the subterranean formation zone. In certain embodiments, the sugar based hardenable resin comprises at least one of glucopyranoside based trifunctional epoxy resin, glucofuranoside based trifunctional epoxy resin, and combinations thereof. In other embodiments, the glucopyranoside based trifunctional epoxy resin is (2',3'-epoxypropyl)-2,3-di-O-(2',3'-epoxypropyl)-4,6-O-benzylidene-α-D-glucopyranoside. In another embodiment, the glucofuranoside based trifunctional epoxy resin is 3,5,6-tri-O-(2,3-epoxypropyl)-1,2-O-isopropylidene-α-D-glucofuranose. In an embodiment, the hardening agent comprises at least one compound selected from the group consisting of amines, amides, acids, anhydrides, phenols, thiols and combinations thereof. In certain embodiments, the ratio of sugar based hardenable resin to hardening agent is about 8:2 to about 2:8 by volume. In other embodiments, the resin-hardener volume by weight of sand is about 3% to about 15% or higher depending on the sand quality. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In an embodiment, the storage modulus of the resin compound remains stable above about 160° C. In another embodiment, the resin compound further comprises carbon nano materials. In some embodiments, the zone comprises proppant particles forming a proppant pack in a fracture. In other embodiments, at least a portion of the hardening agent is encapsulated in a hydrolysable material. In yet another embodiment, a carrier fluid is combined with the coated proppant particles and placed in the zone. In an embodiment, the method further comprises at least one of a mixer, a pump, and combinations thereof, for combining the components of the resin compound and introducing the compound into the formation. In another embodiment, the combining further includes an organosilicon based coupling agent selected from at least one of an aminosilane, an epoxy silane, an organohalogen silane, an organosilane ester, a silyl acetamide, a cyclosiloxane, a cyclosilazane, a silazane, and combinations thereof.

In a further embodiment, a method includes combining a sugar based hardenable resin and a hardening agent to form a resin compound, and coating the resin compound onto at least a portion of proppant particles to create resin-coated proppant particles, wherein the resin compound does not substantially cure during coating. In certain embodiments, the sugar based hardenable resin comprises at least one of glucopyranoside based trifunctional epoxy resin, glucofuranoside based trifunctional epoxy resin, and combinations thereof. In other embodiments, the glucopyranoside based trifunctional epoxy resin is (2',3'-epoxypropyl)-2,3-di-O-(2',3'-epoxypropyl)-4,6-O-benzylidene-α-D-glucopyranoside.

In another embodiment, the glucofuranoside based trifunctional epoxy resin is 3,5,6-tri-O-(2,3-epoxypropyl)-1,2-O-isopropylidene-α-D-glucofuranose. In an embodiment, the hardening agent comprises at least one compound selected from the group consisting of amines, amides, acids, anhydrides, phenols, thiols and combinations thereof. In certain embodiments, the ratio of sugar based hardenable resin to hardening agent is about 8:2 to about 2:8 by volume. In other embodiments, the resin-hardener volume by weight of sand is about 3% to about 15% or higher depending on the sand quality. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In an embodiment, the storage modulus of the resin compound remains stable above about 160° C. In another embodiment, the resin compound further comprises carbon nano materials. In another embodiment, the combining further includes an organosilicon based coupling agent selected from at least one of an aminosilane, an epoxy silane, an organohalogen silane, an organosilane ester, a silyl acetamide, a cyclosiloxane, a cyclosilazane, a silazane, and combinations thereof.

In an embodiment, a method of treating a subterranean formation includes combining a sugar based hardenable resin and a hardening agent to form a resin compound, coating the resin compound onto at least a portion of proppant particles to create resin-coated proppant particles, providing a fracturing fluid, mixing the resin-coated proppant particles with the fracturing fluid, and placing the fracturing fluid into a subterranean formation zone at a pressure sufficient to extend or create at least one fracture in the subterranean formation zone, wherein the resin compound does not substantially cure prior to placing the resin coated proppant particles into the subterranean formation zone. In certain embodiments, the sugar based hardenable resin comprises at least one of glucopyranoside based trifunctional epoxy resin, glucofuranoside based trifunctional epoxy resin, and combinations thereof. In other embodiments, the glucopyranoside based trifunctional epoxy resin is (2',3'-epoxypropyl)-2,3-di-O-(2',3'-epoxypropyl)-4,6-O-benzylidene-α-D-glucopyranoside. In another embodiment, the glucofuranoside based trifunctional epoxy resin is 3,5,6-tri-O-(2,3-epoxypropyl)-1,2-O-isopropylidene-α-D-glucofuranose. In an embodiment, the hardening agent comprises at least one compound selected from the group consisting of amines, amides, acids, anhydrides, phenols, thiols and combinations thereof. In certain embodiments, the ratio of sugar based hardenable resin to hardening agent is about 8:2 to about 2:8 by volume. In other embodiments, the resin-hardener volume by weight of sand is about 3% to about 15% or higher depending on the sand quality. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In an embodiment, the storage modulus of the resin compound remains stable above about 160° C. In another embodiment, the resin compound further comprises carbon nano materials. In some embodiments, the zone comprises proppant particles forming a proppant pack in a fracture. In another embodiment, the combining further includes an organosilicon based coupling agent selected from at least one of an aminosilane, an epoxy silane, an organohalogen silane, an organosilane ester, a silyl acetamide, a cyclosiloxane, a cyclosilazane, a silazane, and combinations thereof.

An embodiment of the invention includes a method of treating a subterranean formation comprising: combining a sugar based hardenable resin, a hardening agent and proppant particles to form resin coated proppant particles, placing the coated proppant particles into a subterranean formation zone, wherein the resin does not substantially cure prior to placing the resin coated proppant particles into the subterranean formation zone. In certain embodiments, the sugar based hardenable resin comprises at least one of glucopyranoside based trifunctional epoxy resin, glucofuranoside based trifunctional epoxy resin, and combinations thereof. In other embodiments, the glucopyranoside based trifunctional epoxy resin is (2',3'-epoxypropyl)-2,3-di-O-(2',3'-epoxypropyl)-4,6-O-benzylidene-α-D-glucopyranoside. In another embodiment, the glucofuranoside based trifunctional epoxy resin is 3,5,6-tri-O-(2,3-epoxypropyl)-1,2-O-isopropylidene-α-D-glucofuranose. In an embodiment, the hardening agent comprises at least one compound selected from the group consisting of amines, amides, acids, anhydrides, phenols, thiols and combinations thereof. In certain embodiments, the ratio of sugar based hardenable resin to hardening agent is about 8:2 to about 2:8 by volume. In other embodiments, the resin-hardener volume by weight of sand is about 3% to about 15% or higher depending on the sand quality. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In an embodiment, the storage modulus of the resin compound remains stable above about 160° C. In another embodiment, the resin compound further comprises carbon nano materials. In some embodiments, the zone comprises proppant particles forming a proppant pack in a fracture. In another embodiment, the combining further includes an organosilicon based coupling agent selected from at least one of an aminosilane, an epoxy silane, an organohalogen silane, an organosilane ester, a silyl acetamide, a cyclosiloxane, a cyclosilazane, a silazane, and combinations thereof.

In many embodiments, the advantages of the invention may include at least one of the following: higher glass transition temperatures ($T_g$) compared to vegetable oil based and mineral oil based epoxy resins; higher thermal stability; improved mechanical properties such as storage modulus and hardness compared to mineral oil based epoxy resins; higher flash points compared to some mineral oil based epoxy resins; and may be environmentally friendly. Further, the reduced viscosity of an uncured resin mixture improves the pumping efficiency of the resin. Also, because it is a reactive diluents, it does not reduce the effective concentration of the resin and provides very good consolidation, even in formation with lower permeabilities and/or higher fines content.

Carrier Fluids

In some embodiments, carrier fluids are used to deliver the hardened sugar based resin coated proppants into a wellbore. These fluids may be traditional drilling fluids, completion fluids, or fracturing fluids. The carrier fluids may be slick water with surfactants, fracturing fluids and brine. In certain embodiments, the carrier fluid comprises a non-aqueous base fluid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof.

Aqueous Base Fluids

The aqueous base fluid of the present embodiments can generally be from any source, provided that the fluids do not contain components that might adversely affect the stability and/or performance of the treatment fluids of the present invention. In various embodiments, the aqueous carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm$^3$ or greater).

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid.

Sugar Based Hardenable Resins

Treatment fluids of the present invention comprise a sugar based hardenable resin. The sugar components of the resins may generally be synthesized by replacing the hydroxyl groups of sugar structured molecules, such as cardanol, sucrose, maltitol, sorbitol, and isosorbide, with oxirane functions. These processes, as well as the resulting resins, are known in the art. (See Niedermann et al., eXPRESS Polymer Letters Vol. 9, No. 2 (2015) 85-94; Z. Rapi et al., European Polymer Journal 67 (2015) 375-382.). In general, using the precursor-derivative is used with at least two epoxy groups, thereby aiding in polymerization.

Figure 1:
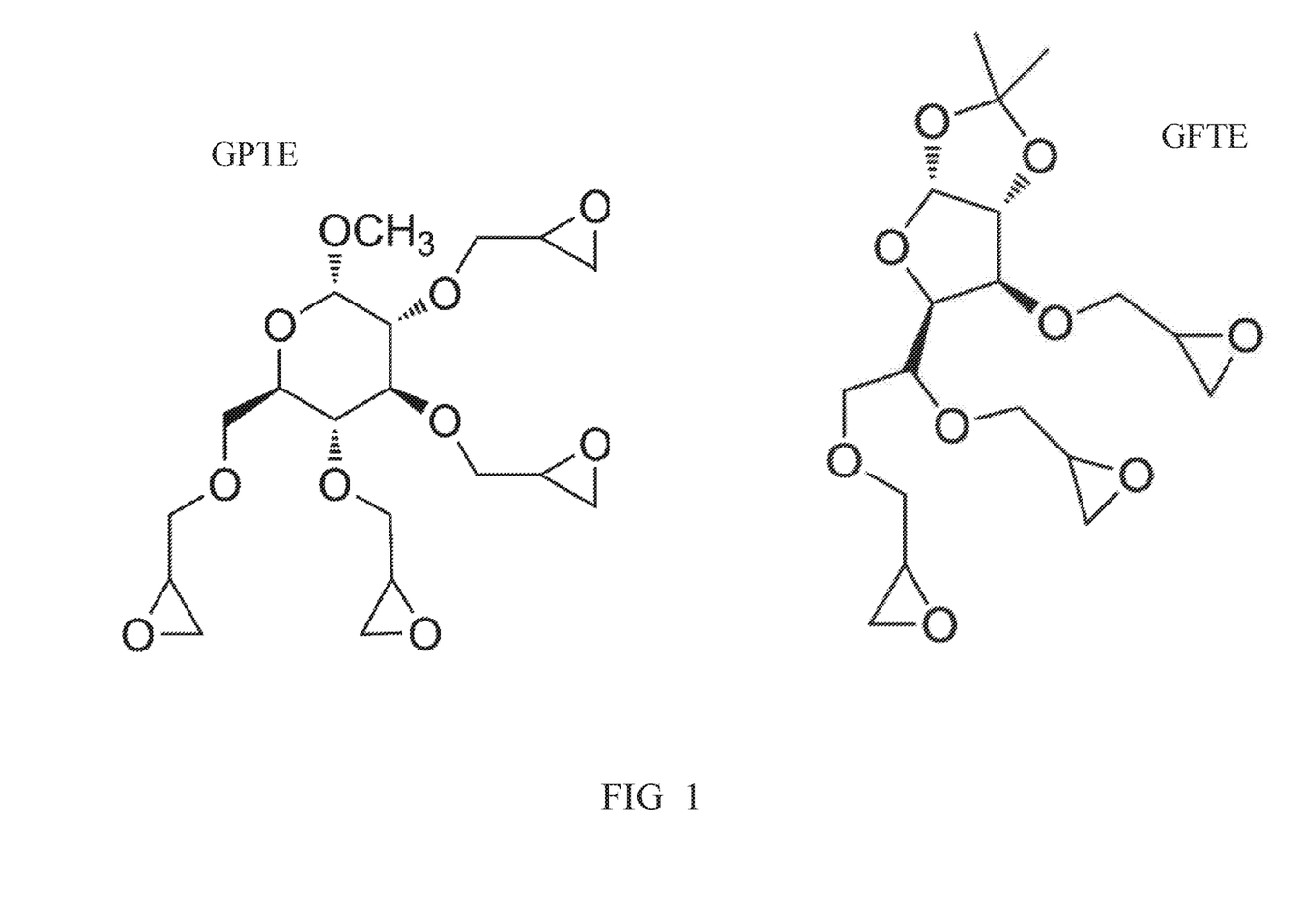
FIG. 1 shows the structures of two sugar based epoxy components according to embodiments of the invention.

In some embodiments, the sugar based hardenable resin comprises glucose as the epoxy monomer precursor. These may include at least one of glucopyranoside based trifunctional epoxy resin ("GPTE"), glucofuranoside based trifunctional epoxy resin ("GFTE"), and combinations thereof. These two structures may be seen in FIG. 1. The glucopyranoside based trifunctional epoxy resin may be (2',3'-epoxypropyl)-2,3-di-O-(2',3'-epoxypropyl)-4,6-O-benzylidene-α-D-glucopyranoside. The glucofuranoside based trifunctional epoxy resin may be 3,5,6-tri-O-(2,3-epoxypropyl)-1,2-O-isopropylidene-α-D-glucofuranose.

In various embodiments, the ratio of sugar based hardenable resin to hardening agent is from about 100:1 to about 1:100 by volume. Or more preferably, the ratio of sugar based hardenable resin to hardening agent is from about 8:2 to about 2:8 by volume.

In exemplary embodiments, the resin-hardener volume by weight of sand is about 0.05% to about 100%. Alternatively, the maximum limit up to which the resin-hardener volume can be used is the amount sufficient to completely block the proppant pack porosity, either consolidated or unconsolidated formation. Preferred ranges can vary between about 1% to about 20% depending upon sand size and quality. More preferably, the range should be about 3% to about 15%. A preferred embodiment is about 3%. An additional preferred embodiment is about 15%.

Hardening Agents

The treatment fluids of the present invention also include a hardening agent. In some embodiments, the hardening agent is any compound that is capable of reacting with sugar based resin to form polymeric chains.

Non-limiting examples of hardening agents include at least one member selected from the group consisting of amines, amides, acids, anhydrides, phenols, thiols, and combinations thereof. In an embodiment, a useful hardener is 4,4'-diaminodiphenyl methane (DDM). Other useful hardeners may include diethylene-toluene-tetramine with 45 g/eq hydrogen equivalent (LONZACURE™ DETDA 80 ("DETDA80")), available from Lonza in Basel, Switzerland, and methyl-tetrahydrophtalic-anhydride with the amount of tetrahydrophtalic anhydride content minimized (ARADUR™ 917 ("AR917")) with 1-methylimidazole (DY070), available from Huntsman Advanced Materials in Basel, Switzerland.

One of skill in the art will realize that the curing time is determined by many factors including resin-hardener combinations, resin-hardener mix ratios, temperature, and pressure.

In some embodiments, hardener is encapsulated in a hydrolysable material. In certain embodiments, the encapsulated hydrolysable material forms a capsule. Using encapsulated well treatment chemicals permits blending of normally incompatible compounds in the treatment fluid. As a non-limiting example, the present invention permits the transport of the hardener to a downhole environment by a treatment fluid having a neutral or basic pH without detrimentally impacting either the treatment fluid or the hardener. A non-limiting list of mechanisms suitable for releasing the encapsulated hardener includes: a change in pH, crushing, rupture, dissolution of the membrane, diffusion and/or thermal melting of the encapsulating membrane. Following placement of the compounds downhole, the hardener is released from the capsules and allowed to react. The controlled downhole release of the hardener allows for delayed curing of the sugar based resins and proppants.

In various embodiments, the ratio of sugar based hardenable resin to hardening agent is from about 8:2 to about 2:8 by volume. In some embodiments, the resin-hardener volume by weight of sand is about 0.05% to about 100%. In exemplary embodiments, the resin-hardener volume by weight of sand is about 3% to about 15%. A preferred embodiment is about 3%. An additional preferred embodiment is about 15%.

Having the benefit of the present disclosure and knowing the temperature and chemistry of a subterranean formation of interest, one having ordinary skill in the art will be able to choose a resin-hardener combination and an amount thereof suitable for producing a desired coating of the proppant particulates.

Coupling Agent

In one embodiment, the hardened resin may further comprise a coupling agent. The hardened resin may comprise three major components: a curable epoxy resin, a hardening agent, and an organosilicon compound as a coupling agent.

In some embodiments, the organosilicon compound is an organosilane. Examples are selected from an aminosilane, an epoxy silane, an organohalogen silane, an organosilane ester, a silyl acetamide, a cyclosiloxane, a cyclosilazane, a silazane, and combinations thereof.

Structural characteristics of the organosilicon compound, according to various embodiments, suitably include Si—OH groups or moieties such as Si—OR or Si—X (where R is an alkyl, cycloalkyl, or aryl; X is halo such as Cl) that are readily hydrolyzed to Si—OH groups either before or during the resin curing process. The Si—OH groups can promote cross-linking between resin-coated proppant particles. In addition, the Si—OH groups can participate in hydrogen-bonding with hydroxyl groups on the surfaces of natural sand proppant particles.

In some embodiments, the organosilicon compound conforms to Formula I:

(I)

In Formula I compounds, $R^1$ and $R^2$ are independently selected from optionally substituted alkyl and optionally substituted aryl. Each instance of optionally substituted alkyl is optionally interrupted by one or more of O, S, and —NH—. In addition, at least one of $R^1$ and $R^2$ is substituted by at least one moiety of the formula —Si(OR)$_n$X$_{3-n}$ wherein each R is independently selected from OH, alkyl, cycloalkyl, and aryl, and wherein at least one R is OH. Variable X is halo, such as F, Cl, Br, or I. Variable n is an integer that is 1, 2, or 3.

In other embodiments, the organosilicon compound is a siloxane, such as one resulting from the self-condensation of one or more silanes bearing Si—OH groups.

Examples of aminosilanes according to other embodiments include aminosilanes such as aminopropyltrimethoxysilane, aminopropyltriethoxysilane, aminopropyl-methyl-dimeth-oxysilane, aminopropyl-methyldiethoxysilane, N-(2-aminoethyl)aminopropyltrimethoxysilane, N-(2-aminoethyl)aminopropyltrimethoxysilane, N-(2-aminoethyl)aminopropyltriethoxysilane, N-(2-aminoethyl)aminopropyl-methyldimethoxysilane, N-cyclohexylaminomethyltriethoxysilane, N-cyclohexylaminomethyl-methyldiethoxysilane, N-cyclohexylaminomethyl-trimethoxysilane, and N-cyclohexylaminomethyl-methyldimethoxysilane.

Illustrative epoxysilanes are beta-(3-4-epoxy-cyclohexyl)ethyltrimethoxysilane and gamma-glycidoxypropyl-trimethoxysilane. Further examples of epoxysilanes include glycidoxypropyltrimethoxysilane, glycidoxypropyltriethoxysilane, glycidoxypropylmethyldimethoxysilane, glycidoxypropylmethyldiethoxysilane, epoxycyclohexylethyltrimethoxysilane, and epoxysilane-modified melamine.

In an embodiment, the coupling agent is present in the hardened resin compound in the amount of about 0.01% to about 25% by weight.

Resin/Hardener Systems

The sugar based epoxy resin systems of the present invention compare very favorably to conventional aromatic and aliphatic resin systems. Conventional resins include diglycidyl ether of bisphenol A ("DGEBA"), triglycidyl ether of glycerol ("GER"), tetraglycidyl ether of pentaerythritol ("PER"). As discussed in Niedermann et al., Table 1 reproduced below (page 89 in Niedermann et al.) indicates that the modules values of the sugar based epoxy resins (GPTE and GFTE) are greater than or in the same range as that of the mineral oil based epoxy resins. Further, the $T_g$ values of the sugar based epoxy resins are higher than those of the mineral oil based resins.

TABLE 1

| | | Storage modulus [MPa] Base resin | | | | | | | | |
|---|---|---|---|---|---|---|---|---|---|---|
| | | GPTE | | GFTE | | DGEBA | | PER | | GER |
| | | Curing Agent | | | | | | | | |
| | | DET | AR | DET | AR | DET | AR | DET | AR | DET | AR |
| Temp ° C. | 0 | 2895 | 3032 | 3058 | 2999 | 2648 | 2817 | 3078 | 3239 | 2965 | 2970 |
| | 25 | 2558 | 2877 | 2727 | 2804 | 2409 | 2716 | 2376 | 3049 | 2386 | 2767 |
| | 50 | 2274 | 2716 | 2341 | 2611 | 2155 | 2627 | 1512 | 2832 | 1076 | 2567 |
| | 75 | 2072 | 2528 | 2034 | 2440 | 2005 | 2559 | 555 | 2532 | 45 | 2343 |
| | | $T_g$ ° C. | | | | | | | | |
| Method | D-M-A | 213 | 188 | 178 | 161 | 177 | 154 | 86 | 115 | 65 | 98 |

TABLE 1-continued

| | Storage modulus [MPa] Base resin | | | | | | | | | |
|---|---|---|---|---|---|---|---|---|---|---|
| | GPTE | | GFTE | | DGEBA | | PER | | GER | |
| | Curing Agent | | | | | | | | | |
| | DET | AR | DET | AR | DET | AR | DET | AR | DET | AR |
| D-S-C | 210 | 178 | 173 | 157 | 179 | 155 | 98 | 116 | 76 | 99 |

DET = DETDA curing agent
DMA = Dynamic Mechanical Analysis
DSC = Differential Scanning Calorimetry
AR = AR917 curing agent Additionally, it has been shown that sugar based polymers (GPTE and GFTE) have almost the same storage modulus values at temperatures to about 160° C. as the mineral based epoxy resins. Above 160° C., GFTE and mineral based epoxy resin storage modulus values start to decrease drastically, whereas GPTE showed stability until about 200° C. (See Niedermann et al., FIGS. 3A-D). This reference also shows that the sugar based epoxy resins may have higher flash points compared to existing mineral oil based epoxy resins. Further, the GPTE and GFTE resins are less viscous compared to DGEBA resins, which may help to better penetrate into the formation and provide better consolidation near the wellbore region and/or deeper in the formation.

Proppants

In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the first treatment fluids or single treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the polymerizable aqueous consolidation composition. In some embodiments, the sand may be graded sand that is sized based on knowledge of the size of the lost circulation zone. The graded sand may have a particle size in the range of from about 10 to about 70 mesh, U.S. Sieve Series. In a preferred embodiment, 20/40 natural silica sand is used. In addition to best quality natural sand like Brady Sand or Northern White Sand; lower quality sand, i.e. sand having higher amount of impurities, higher amount of acid soluble materials and will give greater than about 10% fines even at lower overburden stresses like 2000 psi; may be used with this invention. For purposes of this disclosure, "poor quality sand" is any sand that exhibits at least one property of a) having a higher amount of impurities than Brady Sand or Northern White Sand, b) having a higher amount of acid soluble materials than Brady Sand or Northern White Sand, and c) giving greater than about 10% fines at lower overburden stresses such as those below about 2000 psi, and combinations thereof. Some non-limiting examples of poor quality sand include Nodosaria blanpiedi (NB), and River Sand.

In certain embodiments, the proppants are present in an amount of about 0.05% to about 60%. In exemplary embodiments, less than about 5% by volume of the treatment fluid. In other embodiments, the proppants are present in an amount of less than about 3% by volume of the treatment fluid.

In some embodiments, the proppants are coated with a sugar based hardenable resin and a hardening agent before they have been placed downhole. In other embodiments, the proppants are coated after they have been placed in the subterranean formation.

Nanostructures

The sugar based epoxy resin compositions in this disclosure may also include nanostructures. When nanosturctures are added to the sugar based epoxy resin compositions, mechanical properties may improve dramatically. The nano structures may additionally incorporate electrical and thermal conductive properties into the sugar based epoxy resins. Further, because the surface of a consolidated sugar based epoxy resin can dissipate heat, the live of the consolidated resin may be extended and useful for consolidation mapping.

Nanostructures may include nanoparticles having a scale in the range of approximately 0.1 nanometers to approximately 500 nanometers. Nanostructures may be formed by a process including sol-gel synthesis, inert gas condensation, mechanical alloying, high-energy ball milling, plasma synthesis, electro-deposition and the like. Nanostructures may include metal oxides, nanoclays, carbon nanostructures and the like.

In an embodiment, carbon nanostructures include single-walled carbon nanotubes, multi-walled carbon nanotubes (e.g., 2 to 50 or more walls), carbon nanohorns, graphene, few-layer grapheme, graphene nanoribbons, carbon nanofibers, nanocarbon blacks and calcium carbonates, other elongated carbon nanostructures, and combinations thereof.

The nanostructures may be present in the sugar based resin compositions in the range of about 0.01% to about 15% by weight of the sugar based resin composition.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable. Other potential applications of this resin system, with some minor adjustments such as modifying the dilution factor with the solvent carrier or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the consolidation treatment fluid is placed into a wellbore as a single stream and activated by downhole conditions to form a barrier that substantially seal lost circulation zones or other undesirable flowpaths.

In an embodiment, the consolidation treatment fluid may be introduced into the wellbore, the formation, or a lost circulation zone as a single pill fluid. That is, in such an embodiment, all components of the consolidation treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

For purposes of this disclosure, "overburden stress" refers to the load per unit area or stress overlying an area or point of interest in the subsurface from the weight of the overlying sediments and fluids. As an example, the "overburden stress" may be the load per unit area or stress overlying the hydrocarbon-bearing zone that is being conditioned or produced according to the embodiments described herein. In general, the magnitude of the overburden stress may primarily depend on two factors: 1) the composition of the overlying sediments and fluids, and 2) the depth of the subsurface area or formation. Similarly, underburden refers to the subsurface formation underneath the formation containing one or more hydrocarbon-bearing zones (reservoirs).

In various embodiments, systems configured for delivering the treatment fluids described herein to a downhole location are described. In various embodiments, the systems can comprise a pump fluidly coupled to a tubular, the tubular containing the sugar based hardenable resin compositions, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
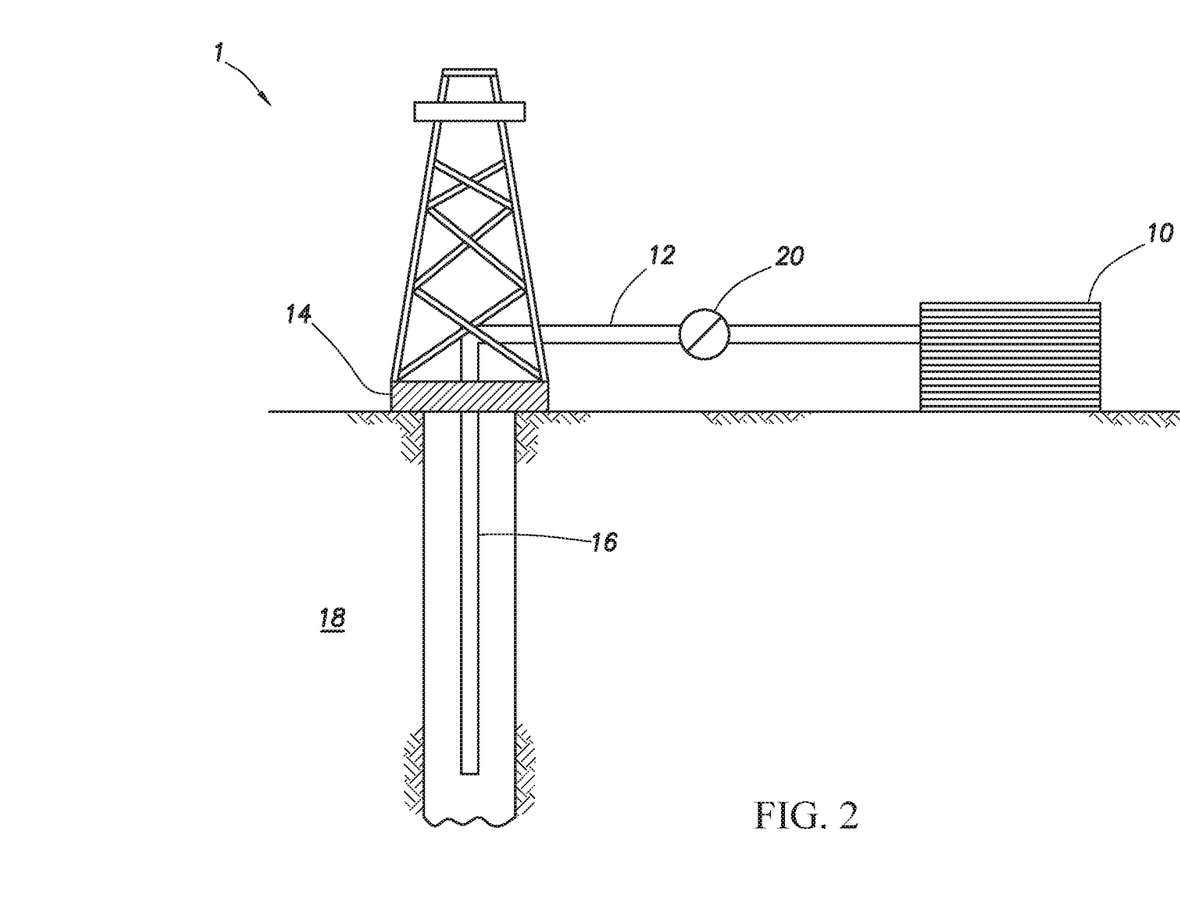
FIG. 2 depicts an embodiment of a system configured for delivering the sugar based resin composition comprising components of the embodiments described herein to a downhole location.

FIG. 2 shows an illustrative schematic of a system that can deliver treatment fluids of the embodiments disclosed herein to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

One of skill in the art will appreciate the many advantages of the present invention. The invention offers an environmentally acceptable resin system that may be used for on the fly coating. Various embodiments also increase the strength of ordinary sand, thereby reducing the need for expensive man-made proppants. Further, the invention is compatible with most fracturing fluids. Additionally, the resin concentration can be varied as per reservoir conditions with respect to temperature. Thus, one system may be sufficient for use over a wide range of temperatures. The invention may also be modified to suit varied reservoir conditions of overburden stresses. There are no anticipated pumping issues from a field equipment point of view due to the low initial viscosity due to the non-crosslinked state. Use of the compositions and methods of the present invention may provide little or no proppant flowback.

Embodiments disclosed herein include:

A: A method combining a sugar based hardenable resin and a hardening agent to form a resin compound, coating the resin compound onto at least a portion of proppant particles to create resin-coated proppant particles, and placing the coated proppant particles into a subterranean formation zone, wherein the resin compound does not substantially cure prior to placing the resin coated proppant particles into the subterranean formation zone.

B: A method comprising: combining a sugar based hardenable resin and a hardening agent to form a resin compound, and coating the resin compound onto at least a portion of proppant particles to create resin-coated proppant particles, wherein the resin compound does not substantially cure during coating.

C: A method comprising: combining a sugar based hardenable resin and a hardening agent to form a resin compound, coating the resin compound onto at least a portion of proppant particles to create resin-coated proppant particles, providing a fracturing fluid, mixing the resin-coated proppant particles with the fracturing fluid, and placing the fracturing fluid into a subterranean formation zone at a pressure sufficient to extend or create at least one fracture in the subterranean zone, wherein the resin compound does not substantially cure prior to placing the resin coated proppant particles into the subterranean formation zone.

D: A method of treating a subterranean formation comprising: combining a sugar based hardenable resin, a hardening agent and proppant particles to form a resin compound; and placing the resin compound into a subterranean formation zone, wherein the resin does not substantially cure prior to placing the resin compound into the subterranean formation zone.

Each of embodiments A, B, C, and D may have one or more of the following additional elements: Element 1: wherein the sugar based hardenable resin comprises at least one of glucopyranoside based trifunctional epoxy resin, glucofuranoside based trifunctional epoxy resin, and combinations thereof. Element 2: wherein the glucopyranoside based trifunctional epoxy resin is (2',3'-epoxypropyl)-2,3-di-O-(2',3'-epoxypropyl)-4,6-O-benzylidene-α-D-glucopyranoside. Element 3: wherein the glucofuranoside based trifunctional epoxy resin is 3,5,6-tri-O-(2,3-epoxypropyl)-1,2-O-isopropylidene-α-D-glucofuranose. Element 4: wherein the hardening agent comprises at least one compound selected from the group consisting of amines, amides, acids, anhydrides, phenols, thiols and combinations thereof. Element 5: wherein the ratio of sugar based hardenable resin to hardening agent is from about 8:2 to about 2:8 by volume. Element 6: wherein the resin-hardener volume by weight of proppant is about 3% to about 15%. Element 7: wherein the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. Element 8: wherein the storage modulus of the resin compound remains stable above about 160° C. Element 9: further comprising carbon nanostructures. Element 10: wherein the zone comprises proppant particles forming a proppant pack in a fracture within the subterranean formation zone. Element 11: wherein at least a portion of the hardening agent is encapsulated in a hydrolysable material. Element 12: further comprising a carrier fluid, wherein coated proppant particles are combined with the carrier fluid and placed in the subterranean formation zone. Element 13: further comprising at least one of a mixer, a pump, and combinations thereof, for combining the components of the resin compound and introducing the compound into the formation. Element 14: wherein the combining further includes an organosilicon based coupling agent selected from at least one of an aminosilane, an epoxy silane, an organohalogen silane, an organosilane ester, a silyl acetamide, a cyclosiloxane, a cyclosilazane, a silazane, and combinations thereof.

While preferred embodiments of the invention have been shown and described, modifications thereof can be made by one skilled in the art without departing from the teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method comprising:
   combining a sugar based hardenable resin and a hardening agent to form a resin compound;
   coating the resin compound onto at least a portion of proppant particles to create resin-coated proppant particles; and
   placing the coated proppant particles into a subterranean formation zone, wherein the resin compound does not substantially cure prior to placing the resin coated proppant particles into the subterranean formation zone.

2. The method of claim 1, wherein the sugar based hardenable resin comprises at least one of glucopyranoside based trifunctional epoxy resin, glucofuranoside based trifunctional epoxy resin, and combinations thereof.

3. The method of claim 2, wherein the glucopyranoside based trifunctional epoxy resin is (2',3'-epoxypropyl)-2,3-di-O-(2',3'-epoxypropyl)-4,6-O-benzylidene-α-D-glucopyranoside.

4. The method of claim 2, wherein the glucofuranoside based trifunctional epoxy resin is 3,5,6-tri-O-(2,3-epoxypropyl)-1,2-O-isopropylidene-α-D-glucofuranose.

5. The method of claim 1, wherein the hardening agent comprises at least one compound selected from the group consisting of amines, amides, acids, anhydrides, phenols, thiols and combinations thereof.

6. The method of claim 1, wherein the ratio of sugar based hardenable resin to hardening agent is from about 8:2 to about 2:8 by volume.

7. The method of claim 1, wherein the resin-hardener volume by weight of proppant is about 3% to about 15%.

8. The method of claim 1, wherein the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof.

9. The method of claim 1, wherein the storage modulus of the resin compound remains stable above about 160° C.

10. The method of claim 1, further comprising carbon nanostructures.

11. The method of claim 1, wherein the zone comprises proppant particles forming a proppant pack in a fracture within the subterranean formation zone.

12. The method of claim 1, wherein at least a portion of the hardening agent is encapsulated in a hydrolysable material.

13. The method of claim 1, further comprising a carrier fluid, wherein coated proppant particles are combined with the carrier fluid and placed in the subterranean formation zone.

14. The method of claim 1, further comprising at least one of a mixer, a pump, and combinations thereof, for combining the components of the resin compound and introducing the compound into the formation.

15. The method of claim 1, wherein the combining further includes an organosilicon based coupling agent selected from at least one of an aminosilane, an epoxy silane, an organohalogen silane, an organosilane ester, a silyl acetamide, a cyclosiloxane, a cyclosilazane, a silazane, and combinations thereof.

16. A method comprising:
    combining a sugar based hardenable resin and a hardening agent to form a resin compound;
    coating the resin compound onto at least a portion of proppant particles to create resin-coated proppant particles;
    providing a fracturing fluid;
    mixing the resin-coated proppant particles with the fracturing fluid; and
    placing the fracturing fluid into a subterranean formation zone at a pressure sufficient to extend or create at least one fracture in the subterranean zone, wherein the resin compound does not substantially cure prior to placing the resin coated proppant particles into the subterranean formation zone.

17. The method of claim 16, wherein the zone comprises proppant particles forming a proppant pack in a fracture.

18. The method of claim 16, wherein the combining further includes an organosilicon based coupling agent selected from at least one of an aminosilane, an epoxy silane, an organohalogen silane, an organosilane ester, a silyl acetamide, a cyclosiloxane, a cyclosilazane, a silazane, and combinations thereof.

19. A method of treating a subterranean formation comprising:
   combining a sugar based hardenable resin, a hardening agent and proppant particles to form a resin compound; and
   placing the resin compound into a subterranean formation zone, wherein the resin does not substantially cure prior to placing the resin compound into the subterranean formation zone.

20. The method of claim 19, wherein the sugar based hardenable resin comprises at least one of glucopyranoside based trifunctional epoxy resin, glucofuranoside based trifunctional epoxy resin, and combinations thereof.

21. The method of claim 19, wherein the proppant particles are at least partially coated with the sugar based hardenable resin before the hardening agent is combined with the at least partially coated particles.

22. The method of claim 19, wherein the combining further includes an organosilicon based coupling agent selected from at least one of an aminosilane, an epoxy silane, an organohalogen silane, an organosilane ester, a silyl acetamide, a cyclosiloxane, a cyclosilazane, a silazane, and combinations thereof.

* * * * *